United States Patent Office 3,635,957
Patented Jan. 18, 1972

3,635,957
STYRYL DYES
Guido R. Genta, Lock Haven, Pa., assignor to
American Aniline Products, Inc.
No Drawing. Filed May 20, 1969, Ser. No. 826,272
Int. Cl. C07d 91/44
U.S. Cl. 260—240 R    6 Claims

ABSTRACT OF THE DISCLOSURE

Water-insoluble disperse yellow dyes, particularly suitable as colorants for polyester fibers, are provided. The dyes are made from a benzaldehyde intermediate having as part of its structure a 2-mercaptobenzothiazole or a thiazolinethiol by reacting the intermediate with a nitrile containing an active methylene group, such as malononitrile. The new dyes give dyeings on polyethylene terephthalate fibers of outstanding fastness properties.

BACKGROUND OF THE INVENTION

Styryl dyes made from cyano compounds containing an active methylene group, such as malononitrile, are known. A series of these dyes used as colorants for polyester, polyamide, and cellulose acetate fibers, is disclosed by Straley et al. in U.S. 3,349,098.

I have discovered a new class of styryl dyes, which are structurally dissimilar to those of Straley et al. and which have improved fastness properties, particularly sublimation fastness, on aromatic polyester fibers.

SUMMARY OF THE INVENTION

In accordance with the invention, there is provided a new class of styryl dyes of the formula:

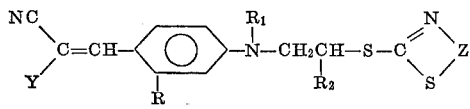

In the above formula, Y is cyano, carbamoyl, N-lower alkyl carbamoyl, N,N-dilower alkyl carbamoyl, N-phenyl carbamoyl, N-loweralkoxy phenylcarbamoyl, N-loweralkyl phenyl carbamoyl, N-halophenyl carbamoyl, lower carbalkoxy, lower cyanocarbalkoxy, phenyl sulfonyl, halophenyl sulfonyl, and lower alkylphenylsulfonyl; Z is alkylene having from 2–3 carbon atoms; phenylene, lower alkyl-o-phenylene, lower alkoxy-o-phenylene, and halo-o-phenylene; R is hydrogen, lower alkyl, and halogen; $R_1$ is hydrogen, lower alkyl, chloro lower alkyl having 2–3 carbon atoms, lower alkoxy, lower alkyl and cyano-lower alkyl and $R_2$ is hydrogen or methyl.

DETAILED DESCRIPTION

The dyes of the invention are made by condensing an aldehyde of the formula:

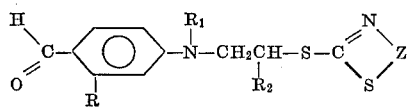

with a nitrile containing an active methylene group of the formula:

wherein Y, Z, R, $R_1$ and $R_2$ have the meanings given aforesaid.

The aldehydes used as starting materials in the condensation reaction are prepared by reacting the haloalkyl group of an aldehyde of the formula:

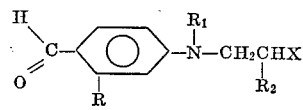

with a 2-mercaptobenzothiazole or with a thiazolinethiol. In the above formula R, $R_1$ and $R_2$ have the meanings given aforesaid, and X is chlorine or bromine.

Aldehydes useful in preparing the intermediate include:

4-[(2-chloroethyl)ethylamino]-o-tolualdehyde;
4-[(2-chloroethyl)ethylamino]benzaldehyde;
4-[(2-chloro-n-propyl)ethylamino]-o-tolualdehyde;
4-[(2-chloro-n-propyl)ethylamino]benzaldehyde;
4-[(2-bromoethyl)ethylamino]-o-tolualdehyde;
4-[(2-bromo-n-propyl)ethylamino]benzaldehyde;
4-[(2-chloroethyl)(2-cyanoethyl)amino]benzaldehyde;
4-[(2-chloro-n-propyl)(2-cyanoethyl)amino]-o-tolualdehyde;
4-[(2-chloroethyl)ethylamino]-o-chlorobenzaldehyde;
4-[(2-chloroethyl)ethylamino]-o-bromobenzaldehyde;
4-[(2-chloroethyl)(2-methoxyethylamino]-o-tolualdehyde; and
4-[(2-chloroethyl)(2-ethoxyethylamino]benzaldehyde.

Useful 2-mercaptobenzothiazoles and thiazolinethiols are those of the formula:

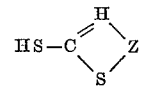

in which Z has the meaning given aforesaid. Particularly suitable are:

2-thiazoline-2-thiol;
5-methyl-2-thiazoline-2-thiol;
4,4-dimethyl-2-thiazoline-2-thiol;
4-ethyl-2-thiazoline-2-thiol;
2-mercaptobenzothiazole;
2-mercapto-5-chlorobenzothiazole;
2-mercapto-4,5-dimethylbenzothiazole;
2-mercapto-4-methoxybenzothiazole;
2-mercapto-4-methylbenzothiazole;
2-mercapto-5-methylbenzothiazole; and
2-mercapto-5-nitrobenzothiazole.

The reaction between the mercaptan and the halogen atom of the intermediate aldehyde is carried out in the presence of a high boiling polar organic solvent; i.e., a solvent having a boiling point of at least 120° C. Useful solvents include n-pentanol, 2-methoxyethanol, 2-ethoxyethanol, n-amyl alcohol, 2-ethoxyethyl acetate, diacetone alcohol, ethylene glycol, benzyl alcohol, diethylene glycol, 2-butoxyethanol, tetrahydrothiophene-1,1-dioxide, N,N-dimethylformamide, N,N-dimethylacetamide, and the like.

The reaction is carried out in the presence of a halogen acceptor, preferably an alkali metal hydroxide, an alkali metal carbonate, or alkali metal acetate. Useful halogen acceptors include potassium hydroxide, sodium hydroxide, sodium carbonate, potassium carbonate, sodium acetate, and the like. At least one equivalent of halogen acceptor is required for each mole of aldehyde intermediate. An excess of halogen acceptor can be used, but no particular advantage is obtained thereby.

The reaction to form the aldehyde used in the subsequent condensation generally takes from 5–10 hours. After the reaction is complete, the mixture is allowed to cool to 30–60° C. and the appropriate nitrile is charged directly to the reaction mixture.

As noted above, useful nitriles are those of the formula:

$$Y-CH_2-CN$$

in which Y is as defined aforesaid. Particularly useful are malononitrile; ethyl cyanoacetate; cyanoethyl cyanoacetate; methyl cyanoacetate; cyanoacetamide; N-methyl cyanoacetamide; cyanoacetanilide; cyanocet-o-anisidide; cyanoacet-p-toluidide; cyanoacet-(m-chloro)anilide; phenylsulfonylacetonitrile; p-tolylsulfonylacetonitrile; p-chlorosulfonylacetonitrile.

Along with the nitrile, there is charged to the reaction mixture an alcohol, such as ethanol or 2-propanol and a small amount of piperidine to assist in the condensation reaction.

The condensation reaction is run at a temperature of 80–120° C., preferably 100–105° C. After condensation is complete, which generally requires from about one and one-half to four hours, the reaction mass is slowly cooled to below room temperature, preferably 10–15° C. The product dye crystallizes slowly from the reaction mixture at these temperature. The dye is recovered by filtration and is subsequently washed with an alcohol, such as 2-propanol, followed by cold water.

The dyestuffs made by the method of the invention are applied to aromatic polyester fibers in the form of a dispersed color powder or paste, which is obtained by wet milling, in a conventional apparatus such as a ball mill, the dye, a dispersant such as sodium lignin sulfonate, and a wetting agent. The dispersed cake or paste thus obtained can be dried, if desired at 70–80° C. and thereafter micropulverized. Sufficient dispersant is added to give a dispersed powder containing generally between 25–40 percent by weight active dyestuff base.

The dispersed powder, when added to water with or without auxiliary agents, forms a near colloidal aqueous dispersion from which the aromatic polyester fiber or goods is dyed in the conventional manner to give a fiber containing from 0.01–2 percent dyestuff.

The dyes of the invention dye polyester fiber in bright greenish yellow shades and are applied with excellent build-up by carrier dyeing, pressure dyeing and thermofixation methods. The light fastness of the dyeing is very good to excellent with only a slight break at 40 hours when subjected to the standard Fade-O-Meter test. Sublimation fastness is outstanding at 350° F. and excellent at 400° F. Cotton reserve is good and superior in this respect to competitive materials. The dyes also can be used for coloring nylon superpolyamide and cellulose triacetate.

My invention is further illustrated by the following examples:

EXAMPLE I

To a one-liter flask equipped with thermometer, stirrer and reflux condenser, there were charged 150 g. N,N-dimethylformamide, 45 g. 4-[(2-chloroethyl)ethylamino]-o-tolualdehyde, 33.5 g. 2-mercaptobenzothiazole, and 20 g. of anhydrous potassium acetate. The mixture was heated slowly to 140–145° C. using nitrogen to help eliminate the acetic acid formed. Refluxing was continued at 140–145° C. for a period of eight hours. After cooling to room temperature, the solution was clarified and recharged to the original reaction flask.

A 100 g. quantity of 2-propanol was added, followed by the addition of 5 g. of piperidine and 16 g. of malononitrile. The resulting mixture was heated to 100–105° C. and was held at this temperature for a period of two hours. It was then cooled slowly to 10–15° C. The dyestuff was formed in crystallized yellow needles. It was filtered and washed first with 100 g. of 2-propanol, followed by cold water. There was thus obtained 65 g. of dry color having a melting point of 195–196° C.

The dye was made into a paste at 13% by ball milling for 24 hours with 20 parts by weight, based on 100 parts dye, of sodium lignin sulfonate, available commercially as Marasperse N-22, 1 part wetting agent and sufficient water to provide the 13% paste. The dispersed dyestuff colored polyester fiber in greenish-yellow shades of excellent properties, including superior light fastness and sublimation fastness.

EXAMPLE II

To a one-liter flask, equipped with thermometer, stirrer, and reflux condenser, there were charged 150 cc. of ethyl amyl ketone (B.P. 156–162° C.), 45 g. 4-[(2-chloroethyl)ethylamino]-o-tolualdehyde, 24 g. 2-mercaptothiazoline, and 20 g. potassium acetate. The mixture was heated slowly to 140–145° C. using nitrogen to help eliminate the acetic acid formed. Refluxing was continued for an additional six hours. After cooling to room temperature, the resulting solution was clarified and recharged to the original reaction flask.

To the clarified mixture was added 100 g. 2-propanol, followed by 5 g. piperidine and 16 g. malononitrile. The mixture was heated to 100–105° C. and held at this temperature for a period of two hours. It was then cooled to 10–15° C., whereupon the dyestuff crystallized in the form of yellow needles. The dyestuff was recovered by filtration and washed with 100 g. of ethanol, followed by cold water. The product had a melting point of 122–125° C. When prepared as a dispered dyestuff as described in Example I, it gave yellow dyeings of excellent strength and fastness properties on polyester fiber as well as on cellulose acetate and cellulose triacetate fibers.

EXAMPLES III–XIX

If the procedure of Example I is followed using reactants substituted as indicated in the following table, the indicated dyes are produced:

TABLE I

| Example | Y | R | $R_1$ | $R_2$ | Z | Color |
|---|---|---|---|---|---|---|
| III | $H_2NCO-$ | $CH_3$ | $C_2H_5$ | H | o-phenylene | Bright greenish yellow. |
| IV | phenylsulfonyl | $CH_3$ | $C_2H_5$ | H | o-phenylene | Do. |
| V | ⟨phenyl with OCH₃⟩-NHCO- | $CH_3$ | $C_2H_5$ | H | o-phenylene | Do. |
| VI | $H_3C-O-\overset{O}{\underset{\|}{C}}-$ | $CH_3$ | $C_2H_5$ | H | o-phenylene | Do. |
| VII | ⟨phenyl⟩-NH-$\overset{O}{\underset{\|}{C}}-$ | H | $C_2H_5$ | H | 4-chloro-o-phenylene | Do. |
| VIII | ⟨phenyl with OCH₃⟩-NH$\overset{O}{\underset{\|}{C}}-$ | H | $CH_2CH_2CN$ | H | o-phenylene | Do. |

TABLE I—Continued

| Example | Y | R | R₁ | R₂ | Z | Color |
|---|---|---|---|---|---|---|
| IX | C₆H₅—SO₂ | H | CH₂CH₂CN | H | o-phenylene | Bright, greenish yellow. |
| X | H₇C₃OC(O)— | H | CH₂ | H | o-phenylene | Do. |
| XI | NC— | CH₃ | C₂H₅ | CH₃ | 3-methoxy-o-phxenylene | Do. |
| XII | NC— | Cl | C₂H₅ | H | o-phenylene | Do. |
| XIII | NC— | CH₃ | C₂H₅ | CH₃ | o-phenylene | Do. |
| XIV | H₅C₂OC(O)— | CH₃ | CH₂CH₂CN | H | o-phenylene | Do. |
| XV | NC— | CH₃ | C₂H₅ | H | 1,2-ethylene | Do. |
| XVI | NC— | CH₃ | C₂H₅ | H | 1,2-propylene | Do. |
| XVII | NC— | H | CH₃ | H | 1,2-ethylene | Do. |
| XVIII | (2-OCH₃-C₆H₄)NHC(O)— | CH₃ | C₂H₅ | H | 1,2-phenylene | Do. |
| XIX | (CH₃)₂NC(O)— | CH₃ | C₂H₅ | H | o-phenylene | Do. |

What is claimed is:

1. A compound of the formula

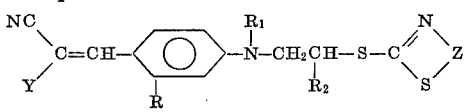

wherein
Y is cyano, carbamoyl, N-lower alkyl carbamoyl, N,N-dilower alkyl carbamoyl, N-phenyl carbamoyl, N-lower alkoxyphenyl carbamoyl, N-lower alkylphenyl carbamoyl, N-halophenyl carbamoyl, lower carbalkoxy, lower cyano carbalkoxy, phenyl sulfonyl, halo phenyl sulfonyl, or lower alkyl phenylsulfonyl;
Z is ethylene, 1,2-propylene, o-phenylene, lower alkyl-o-phenylene, lower alkoxy-o-phenylene, or halo-o-phenylene;
R is hydrogen, lower alkyl or halogen;
R₁ is hydrogen, lower alkyl, chloroethyl, chloropropyl, lower alkoxy lower alkyl, or cyanolower alkyl; and
R₂ is hydrogen or methyl.

2.

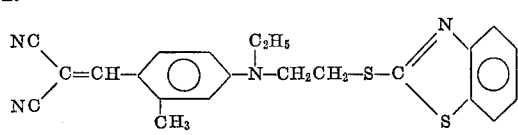

3.

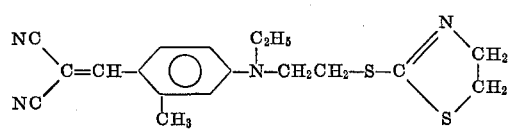

4.

5.

6.

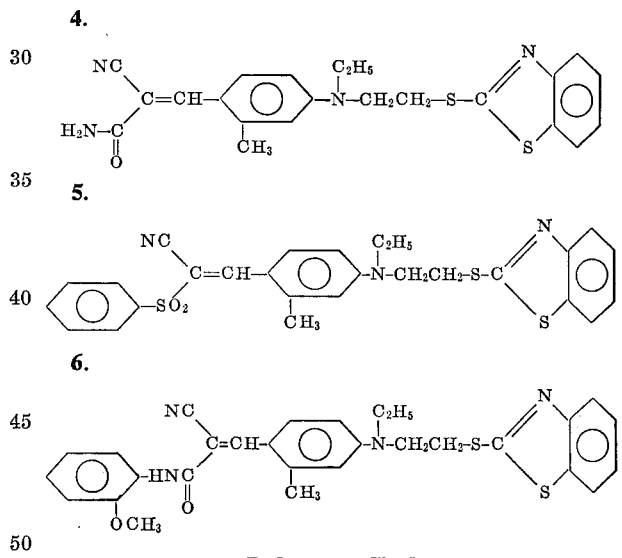

References Cited

UNITED STATES PATENTS

| 2,638,473 | 5/1953 | Edwards | 260—304 |
| 2,850,520 | 9/1958 | Merian et al. | 260—465 |
| 3,257,394 | 6/1966 | Cohen | 260—240.9 |

HENRY R. JILES, Primary Examiner

G. T. TODD, Assistant Examiner

U.S. Cl. X.R.

8—55, 57; 106—193; 260—240 J, 306, 306.7

Notice of Adverse Decision in Interference

In Interference No. 98,174, involving Patent No. 3,635,957, G. R. Genta, STYRYL DYES, final judgment adverse to the patentee was rendered Aug. 13, 1975, as to claim 2.

[*Official Gazette January 13, 1976.*]

Disclaimer 3,635,957.—*Guido R. Genta*, Lock Haven, Pa. STYRYL DYES. Patent dated Jan. 18, 1972. Disclaimer filed May 5, 1976, by the assignee, *American Color & Chemical Corporation*.

Hereby enters this disclaimer to claim 2 of said patent.

[*Official Gazette August 10, 1976.*]

Disclaimer 3,635,957.—*Guido R. Genta*, Lock Haven, Pa. STYRYL DYES. Patent dated Jan. 18, 1972. Disclaimer filed Jan. 12, 1977, by the assignee, *American Color & Chemical Corporation*.

Hereby enters this disclaimer to claims 1 and 5 of said patent.

[*Official Gazette March 8, 1977.*]